June 7, 1938. C. F. MITCHEL 2,120,058
NAME PLATE FASTENING MEANS
Filed Oct. 19, 1937
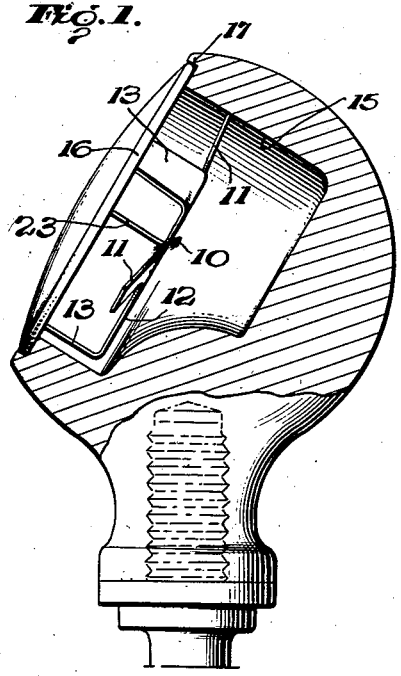
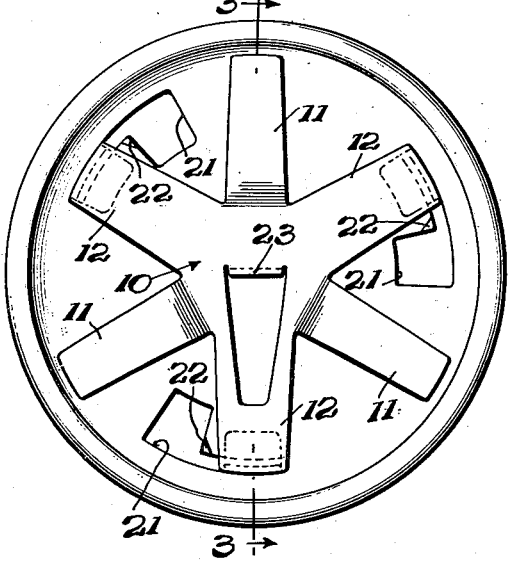
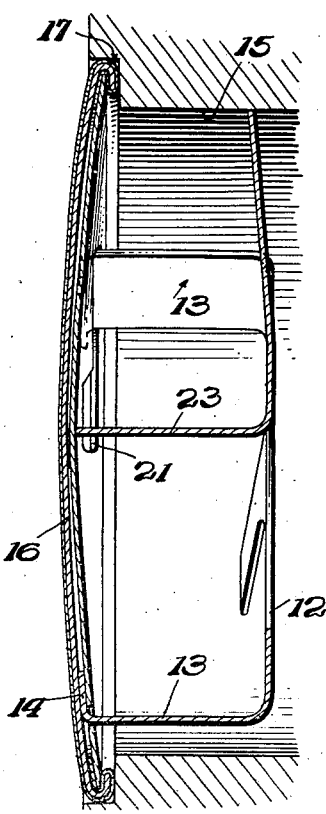
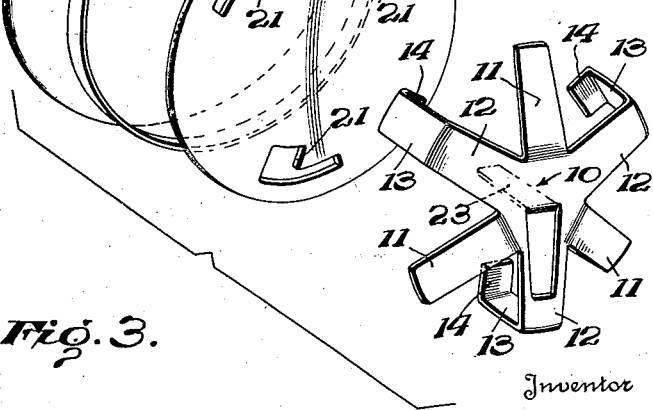
Inventor
Charles F. Mitchel
By
Attorney Patented June 7, 1938

2,120,058

UNITED STATES PATENT OFFICE 2,120,058

NAME PLATE FASTENING MEANS

Charles F. Mitchel, Rochester, N. Y., assignor to Bastian Brothers Company, Rochester, N. Y., a corporation of New York Application October 19, 1937, Serial No. 169,903

7 Claims. (Cl. 40—20)

The present invention relates generally to name plates such as are used in connection with the knobs or handles of bar beer taps, mechanical refrigerators and other articles and machines where a name plate is anchored within the outer end of a bore by virtue of frictional locking engagement of a fastening means carried by the name plate and engaging the wall of the bore, such as disclosed in my Patent 2,070,952, granted under date of February 16, 1937.

The present invention is more particularly an improvement in the particular fastening means employed as well as the manner of association of the fastening means with the name plate, the primary object being the provision of a strong, effective and durable fastening means which may be readily and quickly associated with the name plate without soldering or other attaching operations and which, upon connection with the name plate, becomes automatically centered with respect thereto.

Insofar as the particular construction of the name plate itself is concerned the present invention necessitates only that it shall present a plate at its rear providing in part a means whereby the fastening member may be associated therewith in automatically centered relation thereto without the necessity of soldering or other extraneous operations.

With the above in mind the present invention will be better understood from the following description in detail thereof, and by reference to the accompanying drawing, which forms a part of the specification, and in which—

Figure 1 is a side view, partly broken away and in section, illustrating the practical application of the invention to the name plate for the handle of a bar beer tap.

Figure 2 is a rear elevation showing the name plate with my present fastening member fully in effective connection therewith.

Figure 3 is an enlarged sectional view through the name plate taken on line 3—3 of Figure 1 showing the same in applied position, and Figure 4 is a view in perspective showing the several parts in exploded relation.

Referring now to these figures and particularly to Figures 2 and 4, the fastener proposed by my present invention and generally indicated at 10, is provided with a series of radially outstanding arms in which series gripper arms 11 and supporting arms 12 alternate.

The fastener as a whole is formed of a relatively thin section of sheet metal and the alternate radiating supporting arms 12 have at their outer ends right angular extensions 13 terminating at their free ends in inwardly angular locking terminals 14.

The gripper arms 11 radially outstand between and approximately in the plane of, the supporting arms 12 and it will be noted that the free outer ends of these gripper arms project somewhat beyond the circumferential line of the ends of the supporting arms 12 in order that they may be effective to grip the wall 15 of a bore in an article with which the name plate is to be fastened.

The name plate, generally indicated at 16 may be printed, etched, enameled or otherwise provided with the name, mark or other indicia to be exposed at its front surface when the plate is anchored in the counterbore 17 at the outer end of bore 15, and while I have in the present instance shown the name plate as consisting of a body member 18 with a transparent covering member 19 disposed over its exposed front face and over its flanged edge which cooperates with a backplate 20 to secure the covering 19 in position it is to be understood that the only essential insofar as the present invention is concerned is that the backplate 20 or a plate equivalent thereto, presented at the rear of the name plate as a whole shall have equidistantly spaced bayonet slots 21 adjacent to its periphery. Each of these slots 21 presents a main portion of a size sufficient to receive the several inturned angular locking extremities 14 of the lateral extensions 13 of the supporting arms 12 of the fastener. Each slot furthermore has a circumferentially extending and relatively narrow portion into which, by rotation of the fastening member 10 as a whole, the outer portions of the lateral extensions 13 may be projected so as to fix the locking extensions 14 to positions forwardly of portions of the plate 20 effective to hold the said locking extensions against withdrawal in a direction axially of the plate.

Thus with the name plate presenting a rear member 20 having bayonet slots 21 of the character as previously described, it is merely necessary in assembling the fastener of the present invention that the locking terminals 14 be projected into the main portions of the bayonet slots and then by rotative movement of the fastener, be projected forwardly of portions of the plate 20.

By reference to Figure 2 which shows the parts in completely assembled position it will be noted that the circumferentially extending narrow portions of the bayonet slots 20 are formed of a length substantially greater than the width of the angular locking extremities of the fastener 10 so that by crimping or bending portions of the plate 20 as at 22 adjacent to the larger portions of the slots 21, the locking extremities 14 of the fastener will be securely held in their locked position and prevented from accidental displacement into the large portions of said slots.

In the manner as thus described my invention provides for the ready and easy assembling of the fastener 10 with the slotted rear portion of the name plate, in a manner which avoids the necessity for solder or other extra fastening material or operations and at the same time insures an effective centering of the fastening member 10 with respect to the name plate so that the gripper arms 11 of the fastening member which are thus spaced laterally from the rear of the name plate and are of equal lengths, will project equidistantly from the center of the name plate for uniformly effective gripping of the wall of bore 15 when the associated fastener is pressed into the bore in the seating of the name plate within the counterbore 17.

It is understood that in so seating the name plate, the several gripper arms 11, of proper lengths, will be flexed toward the name plate when the fastener is forced into the bore and will effectively resist movement of the name plate out of the counterbore 17 after it is once positioned therein.

The angular or lateral extensions 13 of the several supporting arms 12 serve to effectively space the body of the fastening member away from and rearwardly of the name plate and combine to effectively brace the fastener at circumferentially spaced points substantially removed from its center. If desirable the central portion of the body of the fastener may be additionally braced by a central laterally bent brace arm 23, which may be struck from the material of the body of the fastener and a portion of the material of one of the supporting arms 12 as plainly seen in Figures 2, 3 and 4. This brace arm 23 will be formed of a length adapting the same to engage at its free end the rear face of the plate 20 when the fastening member 10 is fully associated with and locked on said plate to thus rigidly space the central portion of the fastener with respect to the name plate.

The arrangement which thus provides a plurality of gripper arms free to engage the wall of a bore in which the fastener is anchored, and a plurality of supporting arms in connection with the name plate between the several gripper arms, insures in general a fastening means which may be pressed into the bore or other article without danger of displacement from or collapse with respect to the name plate, and the provision of mechanical connection between the fastener and the name plate of the type set forth, provides for ready, easy assembly of the parts in the first instance and assurance of proper relative disposition coaxially between one another when so joined, in a positive manner which not only eliminates the necessity of soldering or other additional connecting means but also eliminates the danger of misalignment.

What is claimed is:—

1. A name plate having a back member provided with bayonet slots in circumferentially spaced relation adjacent to its periphery, and a fastener having radially outstanding endwise-engaging gripper arms and supporting arms outstanding between the gripper arms, having lateral extensions provided with angular terminals engaged in said slots.

2. A name plate having a back member provided with bayonet slots in circumferentially spaced relation adjacent to its periphery, a fastener having radially outstanding endwise-engaging gripper arms and supporting arms outstanding between the gripper arms, having lateral extensions provided with angular terminals engaged in said slots, and an arm struck up, and extending centrally, from said fastener, and projecting into contact with the central portion of said slotted member.

3. A name plate and the like having bayonet slots at the rear thereof, and a fastener having radially outstanding gripper arms and supporting arms, said supporting arms having lateral extensions provided with angular locking terminals engaged in said bayonet slots.

4. A name plate and the like including a member presenting slots at the rear thereof, and a fastener having outstanding gripper arms and angular arms engaged in said slots to thus connect the fastener to the name plate, said slots and angular arms being relatively disposed to centralize the fastener with respect to the said name plate.

5. A fastener of the character set forth having a series of radially outstanding arms in approximately the same plane, certain of said arms having at their outer ends angular extensions provided with angular terminals, the remaining arms having free ends projecting beyond the first named arms.

6. A name plate including a rear apertured member, and a fastener having a series of radially outstanding arms, certain of said arms having angular extensions interlockingly engaged in the apertures of the plate member to thus connect the fastener in spaced relation to the name plate.

7. A fastener of the character set forth having a series of radially outstanding arms certain of which have angular attaching extensions, the remaining arms having gripping ends projecting outwardly beyond the first named arms.

CHARLES F. MITCHEL.